United States Patent [19]

Sakamoto et al.

[11] Patent Number: 4,738,022
[45] Date of Patent: Apr. 19, 1988

[54] VEHICLE ASSEMBLING-AND-FEEDING SYSTEM

[75] Inventors: Shunji Sakamoto; Tuyoshi Watanabe; Shigeo Okamizu, all of Hiroshima, Japan

[73] Assignee: Mazda Motor Corporation, Japan

[21] Appl. No.: 915,659

[22] Filed: Oct. 6, 1986

[30] Foreign Application Priority Data

Oct. 8, 1985 [JP] Japan .................. 60-225900

[51] Int. Cl.$^4$ .............................. B23P 21/00
[52] U.S. Cl. ..................... 29/712; 29/33 P; 29/430; 29/711; 29/794; 198/345
[58] Field of Search ............. 29/33 P, 429, 430, 469, 29/709, 791, 793, 794, 799, 822, 823, 824, 711, 712; 198/394, 395, 345, 414, 858, 859

[56] References Cited

U.S. PATENT DOCUMENTS

| 2,757,447 | 8/1956 | Barenyi | 29/430 |
| 2,909,128 | 10/1959 | Keen | 29/824 X |
| 4,643,630 | 2/1987 | Shiiba et al. | 198/468.6 X |
| 4,670,974 | 6/1987 | Antoszewski et al. | 29/712 |

FOREIGN PATENT DOCUMENTS

| 3150476 | 6/1985 | Fed. Rep. of Germany | 29/824 |
| 60-56682 | 4/1985 | Japan | |
| 163774 | 8/1985 | Japan | 29/469 |

Primary Examiner—Howard N. Goldberg
Assistant Examiner—Andrew E. Rawlins
Attorney, Agent, or Firm—Gerald J. Ferguson, Jr.; Michael P. Hoffman; Michael J. Foycik, Jr.

[57] ABSTRACT

A vehicle assembling-and-feeding system comprises an engine/suspension feeding line which travels through an engine assembly line and a first suspension assembly line for assembling one of front and rear suspensions to feed the engine and said one suspension, a suspension feeding line which travels through a second suspension assembly line for assembling the other suspension to feed the suspension, a body feeding line for feeding a vehicle body in indexed feed fashion, a slippage detecting station which is provided midway along the body feeding means to detect slippage in the position of the vehicle body fed by the body feeding means in indexed feed fashion, a mounting station disposed downstream of the slippage detecting station, and a mingling feed line which alternately feeds to the mounting station the material fed by the engine/suspension feeding means and the material fed by the suspension feeding means. An automatic mounting device is provided at the mounting station. The automatic mounting device has a pair of mounting tables which are three-dimensionally movable, one being adapted to receive the engine and said one suspension and the other being adapted to receive said other suspension. The automatic mounting device is controlled to compensate for the slippage of the position of the vehicle body detected at the slippage detecting station.

9 Claims, 6 Drawing Sheets

VEHICLE ASSEMBLING-AND-FEEDING SYSTEM

BACKGROUND OF THE INVENTION

1. Field of the Invention

This invention relates to a vehicle assembling-and-feeding system.

2. Description of the Prior Art

Generally, there has been used in assembly of vehicles an assembling-and-feeding system in which various components are assembled on assembly lines and fed to a mounting station and mounted, at the mounting station, on a vehicle body which is fed thereto while being supported by a hanger.

For example, in the vehicle assembling-and-feeding system disclosed in Japanese unexamined patent publication No. 60(1985)-56682, each vehicle body fed by a continuous feed conveyor is transferred to an indexed feed conveyor, while an engine on an assembly line is fed to a mounting table of a mounting device by a conveyor, and when the body fed in indexed feed fashion is stopped, the mounting table is moved upward and the engine is mounted on the body. Thereafter, the body equipped with the engine is transferred to a continuous feed conveyor. Thus, synchronization of the conveyors is facilitated, and the operator's mounting operation is facilitated.

However, in the conventional assembling-and-feeding system, mounting of the engine is effected in a semi-automatic mode and slip in the position of the body must be corrected by the operator. Accordingly, the mounting operation is still complicated. Further, in order to mount the engine and one of the front suspension and the rear suspension at a single mounting station for assembly efficiency, many operators are required.

SUMMARY OF THE INVENTION

In view of the foregoing observations and description, the primary object of the present invention is to provide a vehicle assembling-and-feeding system in which the engine and one of the front and rear suspensions can be mounted on the body at a single mounting station with a high efficiency.

The vehicle assembling-and-feeding system in accordance with the present invention comprises an engine/-suspension feeding means which travels through an engine assembly line and a first suspension assembly line for assembling one of front and rear suspensions to feed the engine and said one suspension, a suspension feeding means which travels through a second suspension assembly line for assembling the other suspension to feed the suspension, a body feeding means for feeding a vehicle body in indexed feed fashion, a slippage detecting station which is provided midway along the body feeding means to detect slippage in the position of the vehicle body fed by the body feeding means in indexed feed fashion, a mounting station disposed downstream of the slippage detecting station, a mingling feed means which alternately feeds to the mounting station the material fed by the engine/suspension feeding means and the material fed by the suspension feeding means, an automatic mounting means which is provided at the mounting station and has a pair of mounting tables which are three-dimensionally movable, one being adapted to receive the engine and said one suspension and the other being adapted to receive said other suspension, and a compensating means which controls the automatic mounting means to compensate for the slippage in the position of the vehicle body detected at the slippage detecting station.

DESCRIPTION OF THE PREFERRED EMBODIMENT

FIGS. 1 to 12 show a vehicle assembling-and-feeding system in accordance with an embodiment of the present invention applied to the assembly of front-engine front-drive type vehicles. An engine assembly area 1 is provided with an engine dress-up line 2 which comes from the engine assembly area 1 and returns thereto. An engine hanging station 3 is disposed midway along the engine dress-up line 2. An engine/suspension feeding line 4 comprising an overhead conveyor passes over the engine hanging station 3. The engine/suspension feeding line 4 further passes over a perimeter rame mounting station 5 and a front-suspension assembly line 6. A suspension feeding line 8 comprising an overhead conveyor passes over a rear-suspension assembly line 7.

Figure 1:
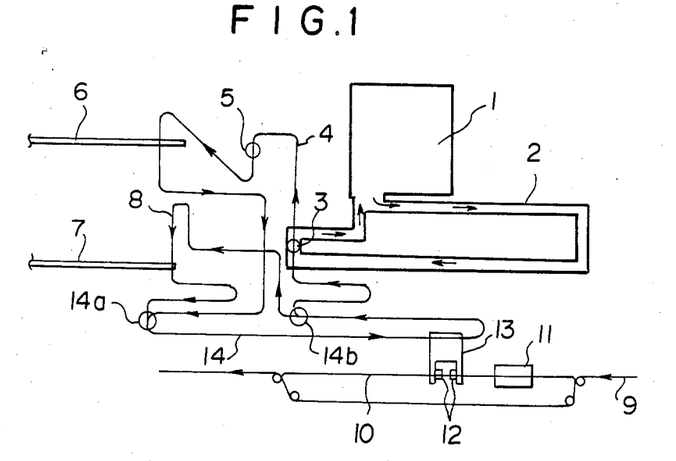
FIG. 1 is a schematic plan view of a vehicle assembling-and-feeding system in accordance with an embodiment of the present invention.

A body continuous-feed line 9 comprises an overhead conveyor which feeds vehicle bodies 21 continuously. A body indexed-feed line 10 branches off from the body continuous-feed line 9. The body indexed-feed line 10 also comprises an overhead conveyor. Below the body indexed-feed line 10 is disposed a mounting station 13 having a pair of automatic mounting devices 12 and a slippage detecting station 11. The engine/suspension feeding line 4 and the suspension feeding line 8 are merged into a mingling feed line 14 at a junction station 14a. To the mingling feed line 14 are alternately fed the parts from the engine/suspension feeding line 4 and the suspension feeding line 8 at the junction station 14a. The mingling feed line 14 passes over the mounting station 13 and branches out into the engine/suspension feeding line 4 and suspension feeding line 8 at a separation station 14b downstream of the mounting station 13.

Figure 5:
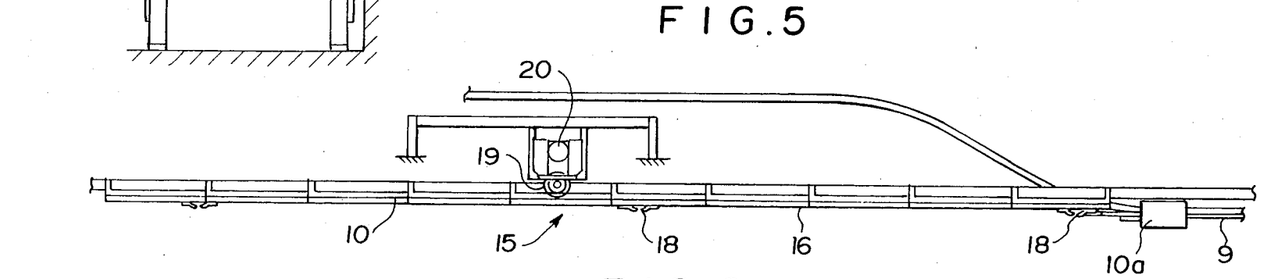
FIG. 5 is a schematic side view showing the body indexing-feed line of the system of FIG. 1.

The conveyor of the body indexed-feed line 10 comprises a rack-and-pinion mechanism 15 having a rack 16 and a pinion 19. A plurality of hanger holders 18 for releasably holding a hanger 17 for suspending the vehicle body 21 are fixed to the rack 16. The pinion 19 is driven by a driving motor 20 to feed the body 21 suspended by the hanger 17 in indices of a pitch determined by the rack 16.

Figure 6:
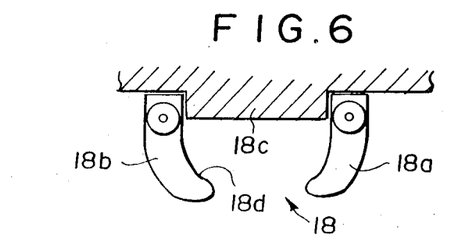
FIG. 6 is an enlarged side view of the hanger holder.

As shown in FIG. 6, the hanger holder 18 comprises a pair of opposed claws 18a and 18b. The claws 18a and 18b are supported for rotation at an intermediate portion and are spring-urged away from each other, that is, the first claw 18c is urged counterclockwisely and the second claw 18b is urged clockwisely as seen in FIG. 6. Counterclockwise rotation of the first claw 18a and the clockwise rotation of the second claw 18b are limited by a downward projection 18b. When the hanger 17 approaches the parting of the lines, the first claw or the upstream side claw 18a is clockwisely rotated or brought down, overcoming the force of the spring by suitable means, and the hanger 17 is forced to override the first claw 18a by a feeder 10a. The hanger 17 is trapped between the claws 18a and 18b to be carried thereby. When the hanger 17 is returned to the body continuous-feed line 9, the second claw or the downstream side claw 18b is brought down, overcoming the force of the spring by suitable means, and the hanger is forced to override the second claw 18b by a feeder which is similar to the feeder 10a though not shown. On the inner surface of the second claw 18b is formed a cam surface so that the hanger 17 is not trapped between the second claw 18b and the projection 18c when the second claw 18b is brought down.

Figure 2:
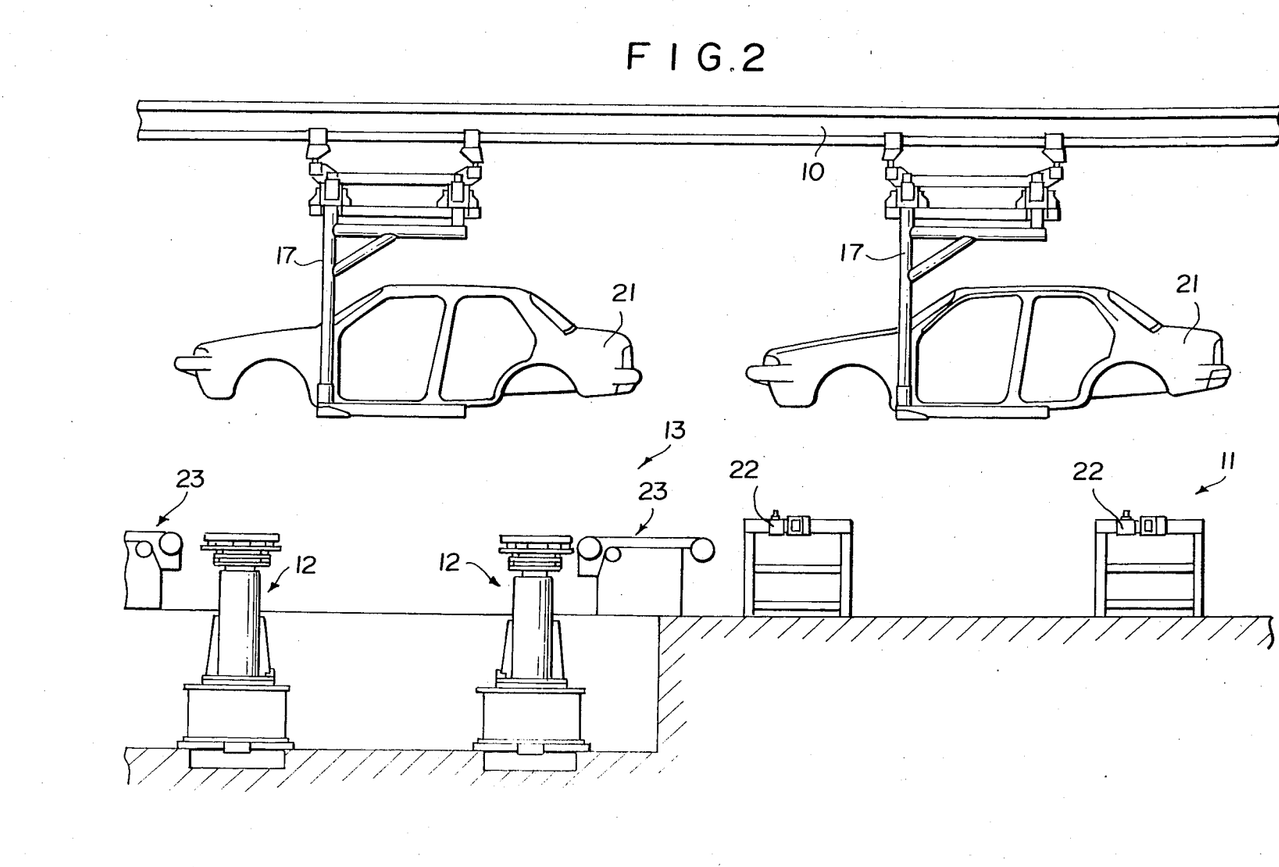
FIG. 2 is a fragmentary side view showing the slippage detecting station and the mounting station in the system of FIG. 1.
Figure 3:
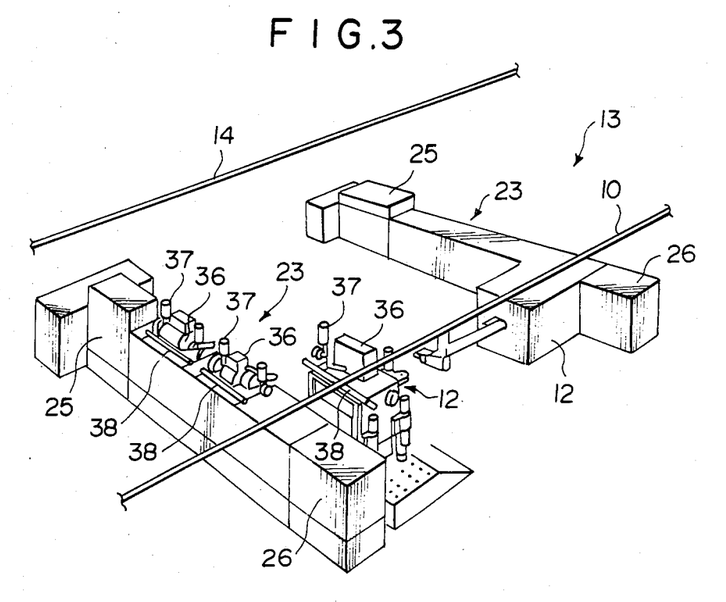
FIG. 3 is a schematic perspective view of the mounting station.

In the slippage detecting station 11, four visual sensors 22 are provided, two on the front side and the other two on the rear side, to detect slippage of the position of the vehicle body 21 from the regular position when the body 21 is stopped at the slippage detecting station 11.

Front and rear transfer devices 23 are provided at the mounting station 13. Each transfer device 23 comprises an upper conveyor 24a and a lower conveyor 24b. The upper and lower conveyors 24a and 24b may be of a rack-and-pinion mechanism or a lift-and-carry mechanism. A lifter 25 is disposed on one end of the conveyors 24a and 24b below the mingling feed line 14. The lifter 25 is movable up and down between a part-receiving position designated by A in FIG. 4, an upper conveyor position (designated by B) at the level of the upper conveyor 24a and a lower conveyor position (designated by C) at the level of the lower conveyor 24b. Another lifter 26 is disposed on the other end of the conveyors 24a and 24b to be movable between an upper conveyor position (designated by D) at the level of the upper conveyor 24a and a lower conveyor position (designated by E) at the level of the lower conveyor 24b.

Said automatic mounting devices 12 are disposed on the other ends of the respective transfer devices 23. As shown in FIGS. 7 to 11, each automatic mounting device 12 comprises a lift mechanism 101 for moving up and down an engine assembly EA (though one of the mounting devices 12 is for mounting the engine assembly EA and the other is for mounting the rear suspension, they are substantially the same in structure, and accordingly description will be made of the mounting device 12 for mounting the engine assembly EA, by way of example), a first slide mechanism 102 for sliding the engine assembly EA placed on a pallet 109 in a horizontal plane back and forth in the transverse direction of the vehicle body 1, a second slide mechanism 103 for sliding the engine assembly EA in a horizontal plane in the longitudinal direction of the vehicle body 1 or in the vehicle body feeding direction, and a rotating mechanism 104 for rotating the engine assembly EA in a horizontal plane.

Figure 8:
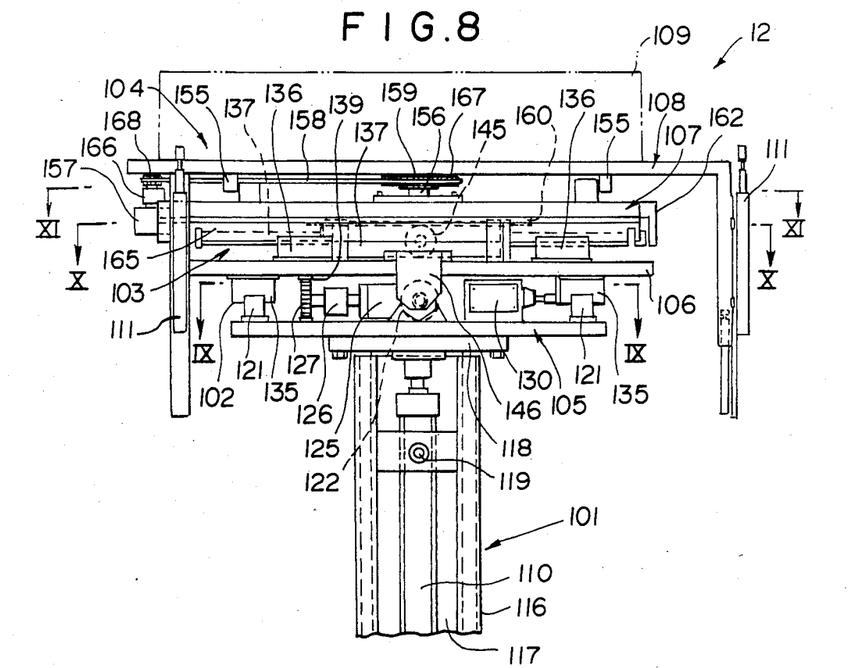
FIG. 8 is an enlarged fragmentary side view showing in detail the automatic mounting device.
Figure 9:
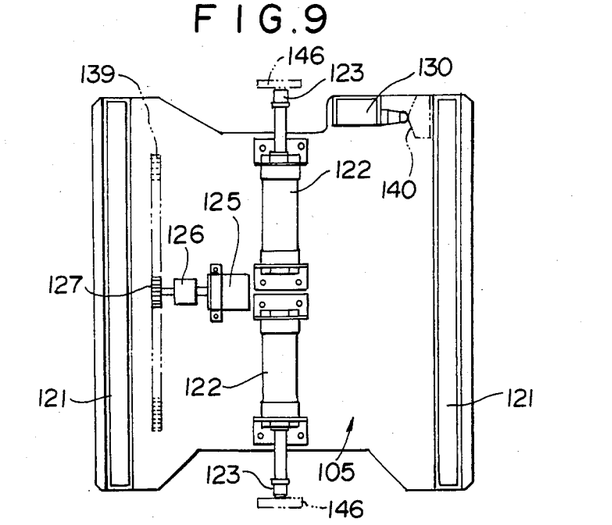
FIGS. 9 to 11 are cross-sectional views respectively taken along lines IX—IX, X—X and XI—XI in FIG. 8.

As best shown in FIG. 8, the lift mechanism 101 includes a stationary post 116 fixedly mounted on a base 115, and an up-and-down post 117 telescopically received in the stationary post 116. The up-and-down post 117 is provided with a top plate 118 on the upper end thereof, and is connected to a hydraulic cylinder 110 by way of a connecting pin 119 to be driven up and down by the cylinder 110.

The first slide mechanism 102 comprises a base plate 105 fixedly mounted on the top plate 118 of the lift mechanism 101, and a first slide plate 106 disposed above the base plate 105 to be opposed thereto. A pair of guide bars 121 are provided on the upper surface of the base plate 105 spaced from each other in the longitudinal direction of the vehicle body, and two pairs of guide receivers 135 are provided on the lower surface of the first slide plate 106 spaced from each other in the transverse direction of the vehicle body. The guide receivers 135 in each pair are spaced from each other in the longitudinal direction of the vehicle body. Each guide receiver 135 has a receiving groove 135a and each of the guide bars 121 is slidably received in the receiving grooves 135a of the guide receivers 135 aligned with each other in the transverse direction of the vehicle body so that the first slide plate 106 is slidable relative to the base plate 105 in the transverse direction of the vehicle body. A rack 139 is provided on the lower surface of the first slide plate 106 and a pinion 127 is in mesh with the rack 139. The pinion 127 is connected to a driving motor 125 by way of a clutch mechanism 126. When the pinion 127 is rotated by the driving motor 125, the first slide plate 106 is slid relative to the base plate 105. By the clutch mechanism 126, operational mode of the first slide mechanism 102 is switched between an automatic operation mode and a manual operation mode. That is, when the clutch mechanism 126 is engaged, the pinion 127 is directly connected to the driving motor 125 to be driven by the motor 125. On the other hand, when the clutch mechanism 126 is released, the pinion 127 is disconnected from the driving motor 125, and accordingly the first slide plate 106 can be manually moved relative to the base plate 105.

A pair of origin indexing cylinders 122 are provided on the base plate 105, one directed forward with respect to the sliding direction of the first sliding plate 106 and the other directed rearward with respect to the sliding direction of the same. Forward and rearward stops 146 are provided on the first slide plate 106 to abut against abutment pieces 123 on the free ends of the respective origin indexing cylinders 122 when the origin indexing cylinders 122 are extended. That is, prior to mounting operation, the origin indexing cylinders 122 are extended until the abutment pieces 123 abut against the stops 146, whereby an origin or a reference position with respect to the transverse direction of the vehicle body is indexed. The first slide mechanism 102 is controlled with respect to the origin or the reference position. It is confirmed by a limit switch 130 on the base plate 105 and a limit guide 140 on the lower surface of the first guide plate 106 whether the origin is precisely indexed.

Figure 10:
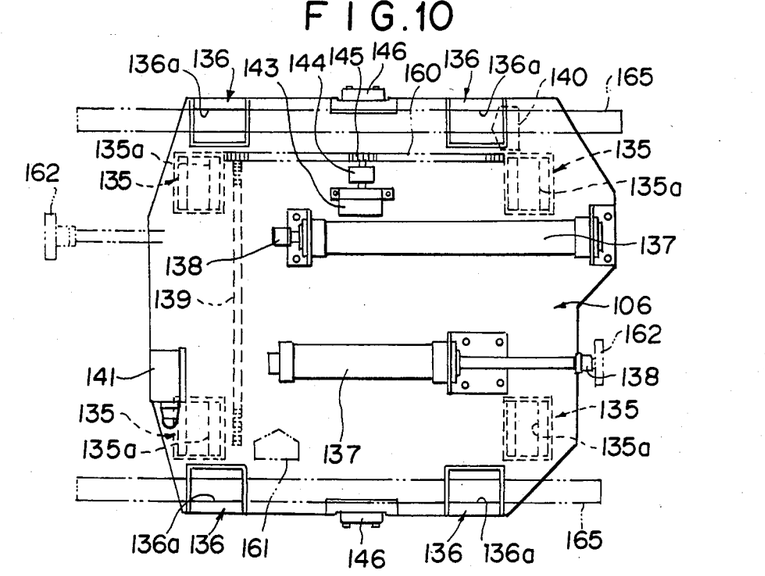
Figure 11:
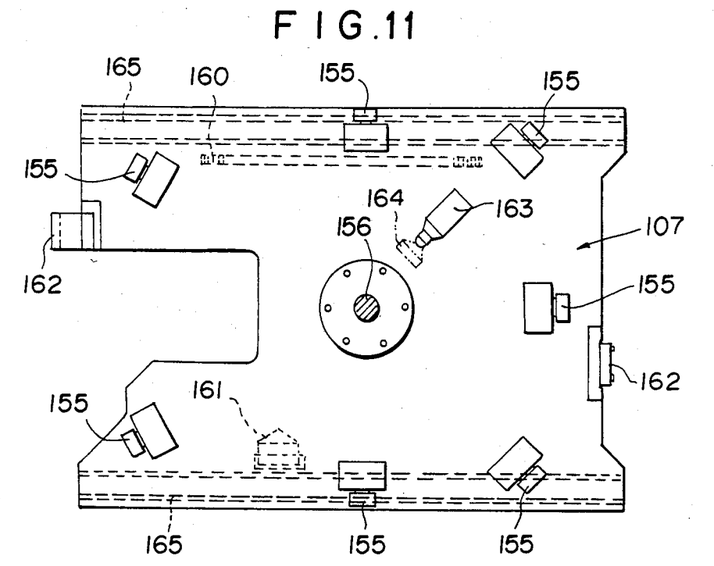

The second slide mechanism 103, as shown in FIGS. 8, 10 and 11, comprises the first slide plate 106 and a second slide plate 107 disposed above the first slide plate 106 to be opposed thereto. A pair of guide bars 165 are provided on the lower surface of the second slide plate 107 spaced from each other in the transverse direction of the vehicle body, and two pairs of guide receivers 136 are provided on the upper surface of the first slide plate 106 spaced from each other in the longitudinal direction of the vehicle body. The guide receivers 136 in each pair are spaced from each other in the transverse direction of the vehicle body. Each guide receiver 136 has a receiving groove 136a and each of the guide bars 165 is slidably received in the receiving grooves 136a of the guide receivers 136 aligned with each other in the longitudinal direction of the vehicle body so that the second slide plate 107 is slidable relative to the first slide plate 106 in the longitudinal direction of the vehicle body. A rack 160 is provided on the lower surface of the second slide plate 107 and a pinion 145 is in mesh with the rack 160. The pinion 145 is connected to a driving motor 143 by way of a clutch mechanism 144. When the pinion 145 is rotated by the driving motor 143, the second slide plate 107 is slid relative to the first slide plate 106. By the clutch mechanism 144, operational mode of the second slide mechanism 103 is switched between an automatic operation mode and a manual operation mode. That is, when the clutch mechanism 144 is engaged, the pinion 145 is directly connected to the driving motor 143 to be driven by the motor 143. On the other hand, when the clutch mechanism 144 is released, the pinion 145 is disconnected from the driving motor 143, and accordingly the second slide plate 107 can be manually moved relative to the first slide plate 106.

A pair of origin indexing cylinders 137 are provided on the first slide plate 106, one directed forward with respect to the sliding direction of the second sliding plate 107 and the other directed rearward with respect to the sliding direction of the same. Forward and rearward stops 162 are provided on the second slide plate 107 to abut against abutment pieces 138 on the free ends of the respective origin indexing cylinders 137 when the origin indexing cylinders 137 are extended. That is, prior to mounting operation, the origin indexing cylinders 137 are extended until the abutment pieces 138 abut against the stops 162, whereby an origin or a reference position with respect to the longitudinal direction of the vehicle body is indexed. The second slide mechanism 103 is controlled with respect to the origin or the reference position. It is confirmed by a limit switch 141 on the first slide plate 106 and a limit guide 161 on the lower surface of the second guide plate 107 whether the origin is precisely indexed.

The rotating mechanism 104 comprises, as shown in FIGS. 8 and 11, the second slide plate 107 and a rotary table 108 disposed above the second slide plate 107 to be opposed thereto. The second slide plate 107 and the rotary table 108 are horizontally located with respect to each other by rotatably inserting a rotational shaft 56 mounted on the second slide plate 107 to project upward substantially at the center of the second slide plate 107 into a bearing portion 59 provided on the rotary table 108 substantially at the center thereof. Further, the rotary table 108 is vertically located with respect to the second slide plate 107 by seven support rollers 155 mounted on the second slide plate 107 to abut against the lower surface of the rotary table 108 for rolling motion. On the bearing portion 159 on the rotary table 108 is mounted a large diameter wheel 167, and on an electric motor 157 is mounted a small diameter wheel 168. A belt 158 is passed around the large diameter wheel 167 and the small diameter wheel 168 so that the rotary table 108 is rotated in a horizontal plane by the motor 157. The small diameter wheel 167 is connected to the electric motor 157 by way of a clutch 166 so that when the clutch 166 is disengaged, the rotary table 108 can be freely rotated separate from the motor 157.

A limit switch 163 is provided on the second slide plate and a limit guide 164 is provided on the rotary table 108. A reference position with respect to the angular position of the rotary table 108 relative to the second slide plate 107 is defined as the position when the limit guide 164 is engaged with the limit switch 163.

On the rotary table 108 is placed the pallet 109 on which the engine assembly EA is placed. Though not shown, the rotary table 108 is provided with a locating device for fixing the pallet 109 to the rotary table 108 in a predetermined position. Further, the pallet 109 is provided with a locating device (not shown) for fixing the engine assembly EA to the pallet 109 in a predetermined position. Four nut runners 111 for clamping the engine assembly EA to the vehicle body are disposed along the peripheral edge of the rotary table 108.

Figure 7:
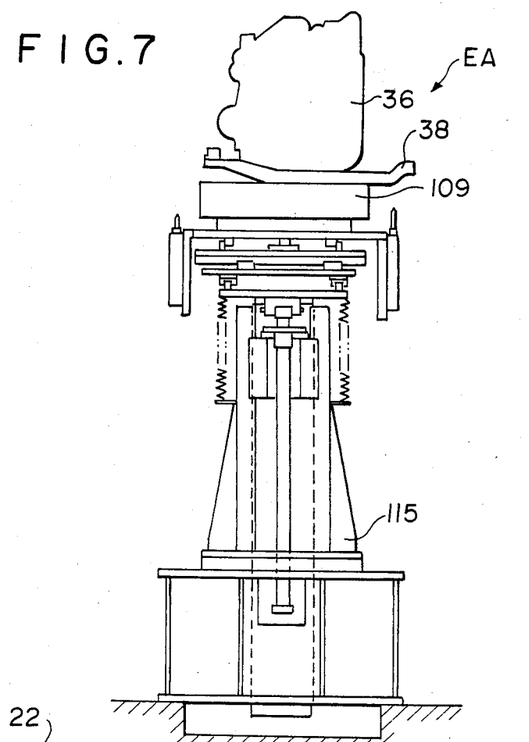
FIG. 7 is a schematic side view of the automatic mounting device employed in the system of FIG. 1.

Operation of the mounting device 12 will be described hereinbelow. The engine assembly EA on the pallet 109 is delivered to the mounting device 12 from the transfer device 23 and placed on the rotary table 108 with the slide plates 106 and 107 and the rotary plate 108 in the respective reference positions. When the vehicle body 21 is stopped at the mounting station 11, the hydraulic cylinder 110 and the driving motors 125, 143 and 157 are operated under the control of a controller (to be described in detail later) according to a predetermined control program to move the slide plates 106 and 107 and the rotary table 108 to position the engine assembly EA in place with respect to the vehicle body without interference with parts which have been mounted on the vehicle body 21. In this conjunction, the controller corrects the control program according to the slippage in the position of the vehicle body detected in the slippage detecting station 11 so that the engine assembly EA can be positioned in place with respect to the vehicle body 21 even if the vehicle body 21 has slipped from a predetermined position. After the engine assembly EA is positioned in place with respect to the vehicle body 21, the nut runners 111 are operated to screw nuts on mounting bolts which have been provided on the vehicle body 21, thereby fixing the engine assembly EA on the vehicle body 21. After the engine assembly EA is thus mounted on the vehicle body 21, the slide plates 106 and 107 and the rotary tables 108 are returned to the original position.

In the case of failure of the electric system, the slide plates 106 and 107 and the rotary table 108 can be manually controlled by disengaging the clutches 126, 144 and 166 and switching the hydraulic control circuit of the hydraulic cylinder to a manual control circuit. Accordingly, the engine mounting operation can be continued even if the electric system fails.

Now, operation of the vehicle assembling-and-feeding system of this embodiment will be described. When the engine 36 is assembled in the engine assembly line 1, the engine 36 is transferred to the dress-up line 2 to be dressed up. When the dressed-up engine 36 is fed to the engine hanging station 3, the engine 36 is transferred to the engine/suspension feeding line 4 to be fed along the engine/suspension feeding line 4 in a suspended state. While the engine 36 is fed along the engine/suspension feeding line 4, a perimeter frame 38 is mounted on the engine 36 at the perimeter frame mounting station 5, and a front suspension 37 assembled in the front-suspension assembly line 6 is mounted on the engine 36 when the engine 36 is passed over the front-suspension assembly line 6. In this particular embodiment, the engine 36, the perimeter frame 38 and the front suspension 37 form said engine assembly EA. The engine assembly EA is further fed to the junction station 14a of the mingling feed line 14. A rear suspension assembled in the rear-suspension assembly line 7 is fed along the suspension feed line 8 to the junction station 14a. The engine assembly EA and the rear suspension are alternately transferred to the mingling feed line 14 in this order and fed to the mounting station 13.

Figure 12:
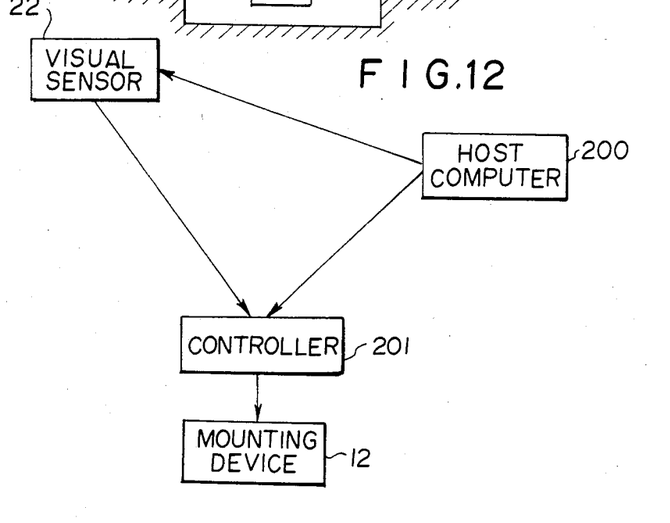
FIG. 12 is a schematic view for illustrating the relation between the slippage detecting station and the mounting device.

At the same time, the vehicle body 21 is fed along the body continuous-feed line 9 while suspended by the hanger 17 and is transferred to the body indexed-feed line 10 by the feeder 10a. Then the vehicle body 21 is fed along the body indexed-feed line 10 to the mounting station 13 through the slippage detecting station 11. When the vehicle body 21 is stopped at the slippage detecting station 11, the visual sensors 22 detect the slippage in the position of the vehicle body 21 from the regular position, and the outputs of the sensors 22 are input into said controller for controlling the hydraulic cylinder 110 and the driving motors 125, 143 and 157. That is, as shown in FIG. 12, a host computer 200 delivers to the visual sensors 22 information on the vehicle body presently fed to the slippage detecting station 11, and the visual sensors 22 detect the slippage in the position of the vehicle body 21 from the regular position on the basis of the information delivered from the host computer 200. The host computer 200 also delivers to the controller 201 information on the vehicle body to be fed to the mounting station 13 from the slippage detecting station 11 and on the engine assembly EA to be mounted on the vehicle body 21 at the mounting station 13. The outputs of the visual sensors 22 are also input into the controller 201. The controller 201 has a built-in memory in which are stored a plurality of control patterns according to which the mounting device 12 is to be controlled. The controller 201 selects one of the control patterns according to the vehicle body 21 and the engine assembly EA to be fed to the mounting station 13 and corrects the control pattern on the basis of the outputs of the visual sensors 22.

Figure 4:
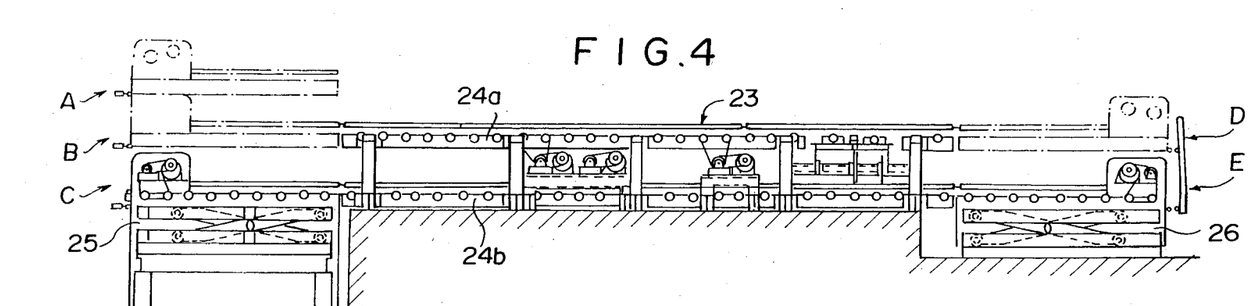
FIG. 4 is schematic side view showing the transfer device in the mounting station.

When the engine assembly EA reaches the mounting station 13, the lifter 25 below the mingling feed line 14 is in the part-receiving position A and the engine assembly EA is placed on the pallet 109 on the lifter 25. Thereafter, the lifter 25 is lowered to the upper conveyor position B and the pallet 109 is connected to the upper conveyor 24a of the transfer device 23. Then the engine assembly EA is fed incrementally by the upper conveyor 24a and is placed on the rotary table 108 of the automatic mounting device 12 at the other end of the transfer device 23 together with the pallet 109.

When the vehicle body 21 is stopped at the mounting station 13, the controller 201 controls the automatic mounting device 12 according to the corrected pattern as described above to position the engine assembly in the predetermined position with respect to the vehicle body 21 taking into account the slippage in the position of the vehicle body 21 during feeding to the mounting station 13. Then the nut runners 111 are operated to fix the engine assembly EA to the vehicle body 21. The rear suspension is mounted on the vehicle body 21 in a similar manner though in the case of the rear suspension, the rear suspension is transferred to the rearwardly disposed mounting device 12 by the rear transfer means 23 and is mounted on the vehicle body 21 by the rearwardly disposed mounting device 12.

The vehicle body provided with the engine assembly EA including the engine, the perimeter frame and the front suspension, and the rear suspension is fed from the mounting station 13 along the body indexing-feed line 10 and then returned to the body continuous-feed line 9. In the mounting station 13, the rotary table 108 is moved downward and the pallet 109 thereon is transferred to the lifter 26 and then transferred to the lower conveyor 24b. By this time, the lifter 25 on the opposite side of the transfer device 23 has been positioned in the lower conveyor position C and receives the pallet 109 from the lower conveyor 24b. Thereafter, the lifter 25 is moved to the part-receiving position A carrying thereon the pallet 109 to prepare to receive another engine assembly EA.

As the engine assembly including the engine and the front suspension and the rear suspension is mounted on a vehicle body fed in indexed feed fashion, by respective automatic mounting devices disposed at front and rear portions of a single mounting station in the vehicle assembling-and-feeding system of this embodiment, mounting can be performed with high efficiency.

Further, since, in the system of the present invention, slippage in the position of the vehicle body is detected at the slippage detecting station provided upstream of the mounting station and control on the mounting device is corrected on the basis of the detected slippage at the mounting station, the mounting operation can be performed more efficiently as compared with cases in which detection of slippage in the position of the vehicle body and correction of the control on the mounting device are both effected at the mounting station.

Though the present invention is applied to assembly of front-engine front-drive type vehicles in the embodiment described above, the present invention can be applied to assembly of vehicles of other types, e.g., front-engine rear-drive type vehicles.

Further, though in the embodiment described above, the mounting device is arranged to move the material to be mounted, e.g., the engine assembly EA, up and down, in the transverse direction of the vehicle body and in the longitudinal direction of the vehicle body and to rotate it with respect to the vehicle body, the mounting device may be arranged only to move the material to be mounted up and down, in the transverse direction of the vehicle body and in the longitudinal direction of the vehicle body without rotating it.

Further, though in the embodiment described above, the slippage in the position of the vehicle body during feeding to the mounting station is compensated for by correcting the control patterns stored in the built-in memory of the controller, the slippage may be compensated for by moving the whole mounting device in the feeding direction of the vehicle body and in the direction perpendicular thereto without correcting the control pattern. This can be accomplished, for example, by providing between the mounting device and the floor a sliding member which can be slid in the feeding direction of the vehicle body and the direction perpendicular thereto and by servo-controlling the sliding member.

We claim:

1. A vehicle assembling-and-feeding system comprising:

an engine/suspension feeding means for conveying engines and suspensions, which travels through an engine assembly line and a first suspension assembly line, for assembling one of front and rear suspensions so as to feed the engine and said one supension, a suspension feeding means which travels through a second suspension assembly line for assembling the other one of said front and rear suspensions so as to feed said other suspension, a body feeding means for feeding a vehicle body in indexed feed fashion, a slippage detecting station for detecting slippage of a vehicle body relative to a predetermined target vehicle body position, the vehicle body being fed by the body feeding means in indexed feed fashion, a mounting station disposed downstream of the slippage detecting station, a mingling feed means which alternately feeds to the mounting station material fed by the engine/suspension feeding means and material fed by the suspension feeding means, an automatic mounting means which is provided at the mounting station and which has a pair of mounting tables which are movable in at least two dimensions, one of said pair mounting tables being adapted to receive the engine and said one suspension, and the other one of said pair of mounting tables being adapted to receive said other suspension, and a compensating means for controlling the automatic mounting means to compensate for the slippage of the position of the vehicle body, relative to said predetermined target vehicle body position, detected at the slippage detecting station.

2. A vehicle assembling-and-feeding system as defined in claim 2 in which each of the mounting tables is movable up and down, in the vehicle body feeding direction and in the direction perpendicular to the vehicle body feeding direction.

3. A vehicle assembling-and-feeding system as defined in claim 2 in which said slippage detecting station is provided with a visual sensor for detecting slippage in the position of the vehicle body.

4. A vehicle assembling-and-feeding system as defined in claim 2 in which said vehicle body is transferred from a continuous feed means to said body feeding means for feeding a vehicle body in indexed feed fashion.

5. A vehicle assembling-and-feeding system as defined in claim 2 in which each of said mounting tables is rotatable about a vertical axis.

6. A vehicle assembling-and-feeding system as defined in claim 2 in which said mingling feed means branches out into the engine/suspension feeding means and suspension feeding means downstream of the mounting station.

7. A vehicle assembling-and-feeding system as defined in claim 6 in which said engine/suspension feeding means travels through a perimeter mounting station between the engine assembly line and the first suspension assembly line.

8. A vehicle assembling-and-feeding system comprising:

an engine/suspension feeding means for conveying engines and suspensions, which travels through (a) an engine assembly line and (b) a first suspension assembly line, for assembling one of front and rear suspensions so as to feed the engine and said one suspension, a suspension feeding means which travels through a second suspension assembly line for assembling the other one of said front and rear suspensions so as to feed said other suspension, a body feeding means for feeding a vehicle body in indexed feed fashion, a slippage detecting station which is provided midway in the position of the vehicle body relative to a predetermined target vehicle body position, the vehicle body being fed by the body feeding means in indexed feed fashion, a mounting station disposed downstream of the slippage detecting station, a mingling feed means which alternately feeds to the mounting station material fed by the engine/suspension feeding means and material fed by the suspension feeding means, an automatic mounting means which is provided at the mounting station and which has a mounting table which is movable in at least two dimensions, said mounting table being adapted to receive the engine or suspension, and a compensating means for controlling the automatic mounting means to compensate for the slippage of the position of the vehicle body, relative to said predetermined target vehicle body position, detected at the slippage detecting station.

9. A vehichle assembling-and-feeding system comprising:

an engine/suspension feeding means for conveying engines and suspensions, which travels through (a) an engine assembly line and (b) a first suspension assembly line, for assembling one of front and rear suspensions so as to feed the engine and said one suspension, a suspension feeding means which travels through a second suspension assembly line for assembling the other one of said front and rear suspensions so as to feed said other suspension, a body feeding means for feeding a vehicle body in indexed feed fashion, a slippage detecting station for detecting slippage of a vehicle body relative to a predetermined target vehicle body position, the vehicle body being fed by the body feeding means in indexed feed fashion, a mounting station disposed downstream of the slippage detecting station, whereby said slippage is detected prior to arrival of the vehicle body at said mounting station, a mingling feed means which alternately feeds to the mounting station material fed by the engine/suspension feeding means and material fed by the suspension feeding means, an automatic mounting means which is provided at the mounting station and which has a mounting table which is movable in at least two dimensions, said mounting table being adapted to receive the engine or suspension, and a compensating means for controlling the automatic mounting means to compensate for the slippage of the position of the vehicle body, relative to said predetermined target vehicle body position, detected at the slippage detecting station.

* * * * *